United States Patent [19]

Ona et al.

[11] Patent Number: 4,616,076

[45] Date of Patent: Oct. 7, 1986

[54] ORGANOPOLYSILOXANE COMPOUNDS CONTAINING SIC-BONDED ALKOXYSILYLALKYL AND POLYOXYALKYLENE RADICALS

[75] Inventors: Isao Ona; Masaru Ozaki; Tadashi Fujii; Yoichioro Taki, all of Chiba, Japan

[73] Assignee: Toray Silicone Co., Ltd., Tokyo, Japan

[21] Appl. No.: 800,186

[22] Filed: Nov. 21, 1985

[30] Foreign Application Priority Data

Nov. 27, 1984 [JP] Japan ................................ 59-249890

[51] Int. Cl.$^4$ ............................................ C08G 77/06
[52] U.S. Cl. ....................................... 528/15; 528/12;
528/21; 528/23; 528/29; 528/31; 528/32;
556/445; 556/446

[58] Field of Search ...................... 528/15, 31, 32, 23,
528/21, 12, 29; 556/445, 446

[56] References Cited

U.S. PATENT DOCUMENTS 4,283,519  8/1981  Pines et al. ............................ 528/26

Primary Examiner—Melvyn I. Marquis
Attorney, Agent, or Firm—George A. Grindahl

[57] ABSTRACT

Organopolysiloxane compounds having both alkoxysilylalkyl radicals and polyoxyalkylene radicals are prepared so that the compounds have a substantially linear structure and at least one of the terminating radicals of the polysiloxane is either an alkoxysilylalkyl radical or a polyoxyalkylene radical. The compounds are particularly useful as a treating agent for conferring hydrophilic properties to a solid substrate.

10 Claims, No Drawings

ORGANOPOLYSILOXANE COMPOUNDS CONTAINING SIC-BONDED ALKOXYSILYLALKYL AND POLYOXYALKYLENE RADICALS

BACKGROUND OF THE INVENTION

The present invention describes novel organopolysiloxane compounds. More specifically, the present invention describes novel organopolysiloxane compounds which contain both alkoxysilylalkyl and polyoxyalkylene radicals in each molecule.

Organopolysiloxanes have a broad range of properties from oils to rubbers to solid resins depending on the nature of the basic structure, size, configuration, type of side chain and molecular weight. They have various industrial applications, e.g., fibers, release paper, electric/electronic materials, construction, paint additives, etc., because they exhibit excellent thermal resistance, cold resistance, oxidation stability, weather resistance, releasability and water repellency. Organopolysiloxanes with alkoxysilylalkyl and polyoxyalkylene radicals in the molecule are known in the prior art. However, organopolysiloxane compounds endblocked with alkoxysilylalkyl and/or polyoxyalkylene and containing both types of radicals in the molecule remain unknown to date.

BRIEF DESCRIPTION OF THE INVENTION

It is an object of this invention to provide new and useful organopolysiloxane compounds which contain both alkoxysilylalkyl radicals and polyoxyalkylene radicals. It is another object of this invention to provide polyoxyalkylene-substituted organopolysiloxane compounds which can be durably applied to solid materials. It is also an object of this invention to provide polyoxyalkylene-substituted organopolysiloxane compounds which can be more completely attached to a solid material. It is a particular object of this invention to provide more economical polyoxyalkylene-substituted organopolysiloxane compounds which have durability when applied to a solid material.

These objects, and other which will become apparent upon consideration of the following disclosure and appended claims, are obtained by the compounds of this invention which, briefly stated, are substantially linear organopolysiloxane compounds which contain at least one silicon-bonded alkoxysilylalkyl radical and at least one silicon-bonded polyoxyalkylene radical, at least one of which is at the terminal portion of a siloxane chain.

In a preferred embodiment of this invention at least one of the siloxane chain-terminating radicals is an alkoxysilylalkyl radical.

DETAILED DESCRIPTION OF THE INVENTION

The present invention relates to organopolysiloxane compounds having the formula $$A(R_2SiO)_x(RQSiO)_y(RGSiO)_zSiR_2A$$

wherein

Q denotes a radical having the formula $-R'SiX_aR_{(3-a)}$,

G denotes a radical having the formula

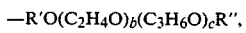

A denotes a radical selected from the group consisting of R, Q and G radicals and, at each occurrence, X denotes an alkoxy or alkoxyalkoxy radical having from 1 to 5 carbon atoms, R denotes a monovalent hydrocarbon or halogenated hydrocarbon radical having from 1 to 10 carbon atoms, R' denotes an alkylene radical having from 2 to 5 carbon atoms, R" denotes a hydrogen atom or a monovalent organic radical having from 1 to 5 carbon atoms, a has a value of 2 or 3, b has a value of from 0 to 100, c has a value of from 0 to 100, c plus b has a value of from 2 to 200, x has a value of from 1 to 500, y has a value of from 0 to 100 and z has a value of from 0 to 100, there being, per molecule of said organopolysiloxane compound, an average of at least 1 each of Q radicals and G radicals, at least one of which is an A radical.

In the formula for the compounds of this invention R represents a $C_1$ to $C_{10}$ monovalent hydrocarbon or halogenated hydrocarbon radical. Concrete examples thereof are alkyl radicals such as methyl, ethyl, propyl and octyl; substituted alkyl radicals such as 2-phenylethyl and 2-phenylpropyl; 3,3,3-trifluoropropyl; aryl radicals such as phenyl and tolyl and substituted aryl radicals. For many uses of the compounds of this invention a majority of the R radicals are preferably methyl radicals. The R radicals in a single molecule may or may not be identical.

Each R' represents a $C_2$ to $C_5$ alkylene radical and concrete examples thereof are $-CH_2CH_2-$, $-CH_2CH_2CH_2-$, $-CH(CH_3)CH_2-$, $-(CH_2)_4-$ and $-(CH_2)_5-$. The R' radicals in a single molecule may or may not be identical.

Each X represents a $C_1$ to $C_4$ alkoxy radical or alkoxyalkoxy radical and concrete examples thereof are methoxy, ethoxy, propoxy and methoxyethoxy. For ease of applying the compositions of this invention to a solid substrate X is preferably a methoxy radical.

Each Q represents a radical with the general formula

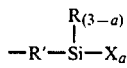

wherein R, R' and X all carry the above definitions and a has a value of 2 or 3. This radical imparts reactivity in the form of hydrolyzability, condensability, etc., to the organopolysiloxane compounds of the present invention. Concrete examples of Q are $-CH_2CH_2-Si(OCH_3)_3$,

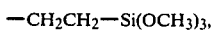

$-(CH_2)_3-Si(OCH_2CH_3)_3$,

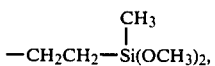

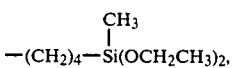

-continued

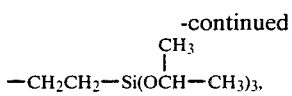

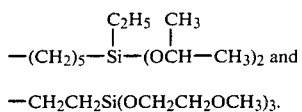

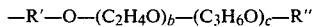

Each R" represents a hydrogen atom or a $C_1$ to $C_5$ monovalent organic radical. Concrete examples of these monovalent organic radicals are alkyl radicals such as methyl, ethyl and propyl and acyl radicals such as acetyl and propionyl.

Each G represents a radical with the general formula $$-R'-O-(C_2H_4O)_b-(C_3H_6O)_c-R''$$

wherein R' and R" carry the preceding definitions. This group imparts hydrophilicity, antistaticity and soiling resistance to the organopolysiloxane of the present invention. The values of b and c can range from 0 to 100 and the sum of $b+c$ can range from 2 to 200.

Each A represents a siloxane chain-terminating radical which is selected from the group consisting of R radicals, Q radicals and G radicals, with the proviso that at least one of the A radicals is a reactive radical, i.e., a Q radical or a G radical, noted above. Both A radicals can be the same or different, as desired. To increase the likelihood that substantially all of the molecules in the compounds of this invention will durably react with a solid substrate when it is applied thereto it is preferred that at least one of said terminating radicals is a Q radical. To assure that substantially all of the molecules in the compounds of this invention will durably react with a solid substrate when it is applied thereto it is preferred that both of said terminating radicals are Q radicals.

The compounds of this invention have a linear siloxane structure of the formula $A(R_2SiO)_x(RQSiO)_y(RGSiO)_zSiR_2A$. In this formula the arrangement of the disubstituted siloxane units is not critical; however it is typically an approximately random arrangement. The arrangement of the siloxane units in the above formula has the conventional meaning and is not to be interpreted as requiring a block type arrangement of siloxane units. Furthermore, although the compounds of this invention are described as having a linear molecular structure, the presence of trace amounts of branching siloxane units having the formulae $SiO_{3/2}$ and $SiO_{4/2}$, frequently present in commercial organopolysiloxanes, are contemplated herein.

Concrete examples of the compounds of this invention include, but are not limited to, those shown in the examples disclosed below and the following:

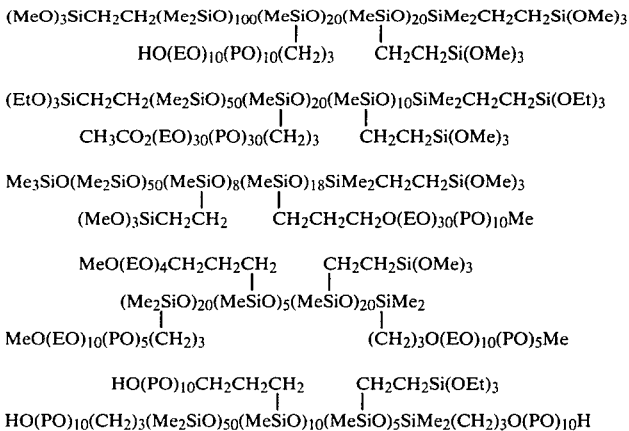

as well as compounds in which 1 Si-bonded methyl group at the end of the preceding organopolysiloxanes is changed to phenyl or 3,3,3-trifluoropropyl, compounds in which all or part of the dimethylpolysiloxane units are changed to methylphenylsiloxane units or methyl(n-octyl)siloxane units and compounds in which some or all of the dimethylpolysiloxane units are changed to methyl(3,3,3-trifluoropropyl)siloxane units. Herein Me, Et, EO and PO denote $CH_3$, $CH_3CH_2$, $C_2H_4O$ and $C_3H_6O$, respectively.

The synthesis of the organopolysiloxane compounds of the present invention is exemplified as follows.

When both A radicals are Q the organopolysiloxane of the present invention can be produced by the following method. First, a silane with the general formula

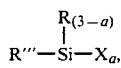

wherein, R, X and a carry their definitions from above and R''' denotes a $C_2$ to $C_5$ alkenyl radical, is addition reacted with an organohydrogendisiloxane with the general formula $$HR_2SiOSiR_2H,$$

wherein R carries its definition from above, and, optionally, with a cyclic organohydrogenpolysiloxane with the general formula, $$(RHSiO)_4$$

wherein R carries its definition from above, in the presence of a platinum-type catalyst such as chloroplatinic acid to synthesize the compound with the general formula

wherein R, R', X and a carry their definitions from above and, optionally, the compound with the general formula $$\underset{|}{(RSiO)_4} \\ R'SiX_aR_{(3-a)}$$

wherein R, R', X and a carry their definitions from above. These products are then copolymerized with the cyclic organohydrogenpolysiloxane with the general formula $$(RHSiO)_4,$$

wherein R carries its definition from above, and, optionally, with the cyclic diorganopolysiloxane with the general formula $$(R_2SiO)_4,$$

wherein R carries its definition from above, in the presence of an acid catalyst such as sulfuric acid, nitric acid, trifluoromethanesulfonic acid or activated clay in order to synthesize an organohydrogenpolysiloxane with the general formula $$\underset{|}{R_{(3-a)}X_aSiR'} \\ X_aR_{(3-a)}SiR'(R_2SiO)_x(RSiO)_y(RHSiO)_zSiR_2R'SiX_aR_{(3-a)}$$

wherein R, R', X, a, x, y and z all carry their definitions from above.

Thereafter, said organohydrogenpolysiloxane is similarly addition reacted with an alkenyl radical-containing polyoxyalkylene with the general formula $$R'''—O—(C_2H_4O)_b—(C_3H_6O)_c—R'',$$

wherein R'', R''', b and c all carry their definitions from above, in the presence of a platinum-type catalyst in order to synthesize the organopolysiloxane compound of the present invention.

If it is desired to have some of the A radicals in the compounds of this invention be R radicals and/or G radicals, in addition to Q radicals, this can be accomplished in this preparative method by including some $R_3SiOSiR_3$ and/or some $HR_2SiOSiOR_2H$, respectively, in the copolymerization step, noted above.

When both A radicals are G, a cyclic organohydrogenpolysiloxane with the general formula $$(RHSiO)_4,$$

wherein R carries its definition from above, is first addition reacted with a silane with the general formula $$\underset{|}{R_{(3-a)}} \\ R'''—Si—X_a,$$

wherein R, R''', X and a all carry their definitions from above, in the presence of a platinum-type catalyst such as chloroplatinic acid in order to synthesize the compound with the general formula $$\underset{|}{(RSiO)_4} \\ R'SiX_aR_{(3-a)},$$

wherein R, R', X and a all carry their definitions from above. This compound is then copolymerized with an organohydrogendisiloxane with the general formula $$HR_2SiOSiR_2H,$$

wherein R carries the definition from above, and, optionally, with a cyclic organohydrogenpolysiloxane with the general formula $$(RHSiO)_4,$$

wherein R carries its definition from above, and/or a cyclic diorganopolysiloxane with the general formula $$(R_2SiO)_4$$

wherein R carries the definition from above in the presence of an acid catalyst such sulfuric acid, nitric acid, trifluoromethanesulfonic acid or activated clay in order to synthesize an organohydrogenpolysiloxane with the general formula $$\underset{|}{H(R_2SiO)_x(RSiO)_y(RHSiO)_zSiR_2H} \\ R'SiX_aR_{(3-a)}$$

wherein R, R', X, a, x, y and z all carry their definitions from above.

Said organohydrogenpolysiloxane is then similarly addition-reacted with an alkenyl group-containing polyoxyalkylene with the general formula $$R'''—O—(C_2H_4O)_b—(C_3H_6O)_c—R''$$

wherein R'', R''', b and c all carry their definitions from above in the presence of a platinum-type catalyst in order to synthesize the organopolysiloxane compound of the present invention.

If it is desired to have some of the A radicals in the compounds of this invention be R radicals and/or Q radicals, in addition to G radicals, this can be accomplished in this preparative method by including some $R_3SiOSiR_3$ and/or some $QR_2SiOSiOR_2Q$, respectively, in the copolymerization step, noted above.

The present invention will be explained using examples of execution. These examples are disclosed to teach further how to practice this invention and are not to be used to limit the present invention, which is properly delineated by the appended claims.

EXAMPLE 1

2.4 g cyclic methylhydrogenpolysiloxane tetramer, 8.5 g organodisiloxane with the formula $$(CH_3O)_3SiCH_2CH_2—\underset{\underset{CH_3}{|}}{\overset{\overset{CH_3}{|}}{Si}}—O—\underset{\underset{CH_3}{|}}{\overset{\overset{CH_3}{|}}{Si}}—CH_2CH_2Si(OCH_3)_3$$

and 0.001 g trifluoromethanesulfonic acid as catalyst are all placed in a 300 ml three-necked flask equipped with a reflux condenser and then polymerized at 60° C. for 3 hours. The catalyst is neutralized with 2 g calcium carbonate followed by filtration with a filter aid.

46 g of the product, 26 g allyl group-containing polyoxyalkylene with the formula

CH$_2$=CHCH$_2$O—(CH$_2$CH$_2$O)$_{12}$—COCH$_3$ and 20 g toluene are then charged to a reactor and the internal temperature is then raised to 85° C. The mixture is combined with 0.09 g of a 2 wt % isopropyl alcohol solution of chloroplatinic acid and then reacted at 115° C. for 2 hours.

The volatiles are then stripped in vacuo at 130° C./15 mm Hg and the unreacted allyl group-containing polyoxyalkylene is then centrifugally separated. An oil is obtained with a viscosity of 114 cs (25° C.) and an index of refraction of 1.4310 (25° C.) and this is confirmed to be an organopolysiloxane with the formula

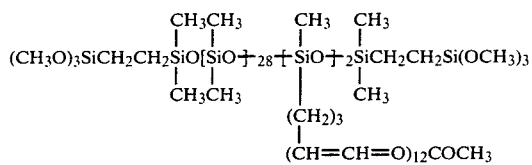

according to the following analytical results.

Infrared absorption (IR) spectral analysis (refer to Chart I).
2900 cm$^{-1}$ methylene, Si—CH$_3$ stretching vibration (strong)
1740 cm$^{-1}$ C=O stretching vibration (medium)
1260 cm$^{-1}$ SiCH$_2$ deformation vibration (strong)
1100 cm$^{-1}$ SiOSi deformation vibration (strong)
800 cm$^{-1}$ Si—CH$_3$ deformation vibrations (strong)

Nuclear magnetic resonance (NMR) spectral analysis (refer to Chart II).
δ=0.3 ppm Si—CH$_3$; =3.5 ppm C—CH$_2$O, SiOCH$_3$

EXAMPLE 2

79.1 g cyclic dimethylpolysiloxane, 5.1 g tetramethyldisiloxane, 15.8 g of cyclic polysiloxane having the formula

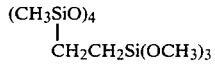

and 0.002 g trifluoromethanesulfonic acid as the polymerization catalyst are all placed in a 300 ml three-necked flask equipped with a reflux condenser and then polymerized at 60° C. for 3 hours. The catalyst is neutralized with 2 g calcium carbonate followed by filtration with a filter aid.

60.3 g of the product, 34.5 g of the allyl group-containing polyoxyalkylene described in Example 1 and 30 g toluene are all placed in a reactor and the internal temperature is then raised to 85° C. The mixture is then combined with 0.12 g of a 2 wt % isopropyl alcohol solution of chloroplatinic acid and then reacted at 115° C. for 2 hours.

The volatiles are stripped in vacuo at 130° C./15 mm Hg and the unreacted allyl group-containing polyoxyalkylene is then centrifugally separated. A oil is obtained with a viscosity of 300 cs (25° C.) and an index of refraction of 1.4310 (25° C.) and this is confirmed to be an organopolysiloxane with the formula

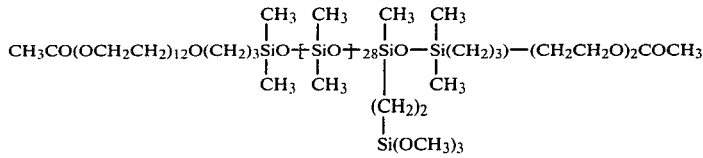

according to the following analytical results.

Infrared absorption (IR) spectral analysis (refer to Chart 3).

In the vinicity of 2900 cm$^{-1}$ methylene, Si—CH$_3$ stretching vibration (strong)
1740 cm$^{-1}$ C=O stretching vibration (medium)
1260 cm$^{-1}$ SiCH$_2$ deformation vibration (strong)
1100 cm$^{-1}$ SiOSi deformation vibration (strong)
800 cm$^{-1}$ Si—CH$_3$ deformation vibration (strong).

Nuclear magnetic resonance (NMR) spectral analysis (refer to Chart 4).
δ=0.3 ppm Si—CH$_3$; =3.5 ppm C—CH$_2$O, SiOCH$_3$

EXAMPLE 3

One molar portion of a disiloxane having the formula HMe$_2$SiOSiMe$_2$H, 25 molar portions of a cyclic polysiloxane having the formula (Me$_2$SiO)$_4$ and one molar portion of an organohydrogenpolysiloxane having the average formula Me$_3$SiO(MeHSiO)$_{26}$SiMe$_3$ are copolymerized using an acid catalyst. The catalyst is neutralized with calcium carbonate and the siloxane polymer is filtered. The filtered polymer is then addition reacted sequentially with approximately 9 molar parts of CH$_2$=CHSi(OMe)$_3$ and with approximately 18 molar portions of an allyl radical-containing polyoxyalkylene having the formula CH$_2$=CHCH$_2$O(CH$_2$CH$_2$O)$_{30}$(CH$_2$CHCH$_3$O)$_{10}$CH$_3$ in the presence of a small amount of a 2 wt % isopropyl alcohol solution of chloroplatinic acid, as noted in Examples 1 and 2. After removal of volatile materials there remains an organopolysiloxane compound of this invention having the nominal formula

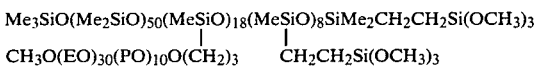

SIMPLE EXPLANATION OF THE FIGURES

FIGS. 1 and 3 show the results for the infrared absorption spectral analyses of the products produced in Examples 1 and 2, respectively.

FIGS. 2 and 4 show the results for the nuclear magnetic resonance analyses of the products produced in Examples 1 and 2, respectively.

UTILITY OF THE INVENTION

Since the novel organopolysiloxane compounds of the present invention exhibit excellent reactivity and hydrophilicity, they are appropriately used as starting materials for sealants or elastomers, as treatment agents for various substrates or as additives to various resin and rubbers.

That which is claimed is:
1. Organopolysiloxane compounds having the formula $$A(R_2SiO)_x(RQSiO)_y(RGSiO)_zSiR_2A$$

wherein

Q denotes a radical having the formula $-R'SiX_aR_{(3-a)}$

G denotes a radical having the formula $$-R'O(C_2H_4O)_b(C_3H_6O)_cR'',$$

A denotes a radical selected from the group consisting of R, Q and G radicals and, at each occurrence, X denotes an alkoxy or alkoxyalkoxy radical having from 1 to 5 carbon atoms, R denotes a monovalent hydrocarbon or halogenated hydrocarbon radical having from 1 to 10 carbon atoms, R' denotes an alkylene radical having from 2 to 5 carbon atoms, R" denotes a hydrogen atom or a monovalent organic radical having from 1 to 5 carbon atoms, a has a value of 2 or 3, b has a value of from 0 to 100, c has a value of from 0 to 100, c plus b has a value of from 2 to 200, x has a value of from 1 to 500, y has a value of from 0 to 100 and z has a value of from 0 to 100, there being, per molecule of said organopolysiloxane compound, an average of at least 1 each of Q radicals and G radicals, at least one of which is an A radical.

2. Organopolysiloxane compounds according to claim 1 wherein each R radical is a methyl radical.

3. Organopolysiloxane compounds according to claim 2 wherein each X radical is a methoxy radical.

4. Organopolysiloxane compounds according to claim 3 wherein one A radical is a methyl radical.

5. Organopolysiloxane compounds according to claim 3 wherein one A radical is a Q radical.

6. Organopolysiloxane compounds according to claim 3 wherein one A radical is a G radical.

7. Organopolysiloxane compounds according to claim 3 wherein both A radicals are Q radicals.

8. Organopolysiloxane compounds according to claim 3 wherein both A radicals are G radicals.

9. Organopolysiloxane compounds according to claim 1 having the formula $Me_3SiO(Me_2SiO)_x(MeQSiO)_y(MeGSiO)_zSiMe_2Q$ wherein x, y and z are positive integers.

10. Organopolysiloxane compounds according to claim 9 wherein Q denotes the $-CH_2CH_2Si(OMe)_3$ radical.

* * * * *